W. B. POTTER.
BLOCK SIGNAL SYSTEM.
APPLICATION FILED JAN. 22, 1910.
1,063,591.
Patented June 3, 1913.
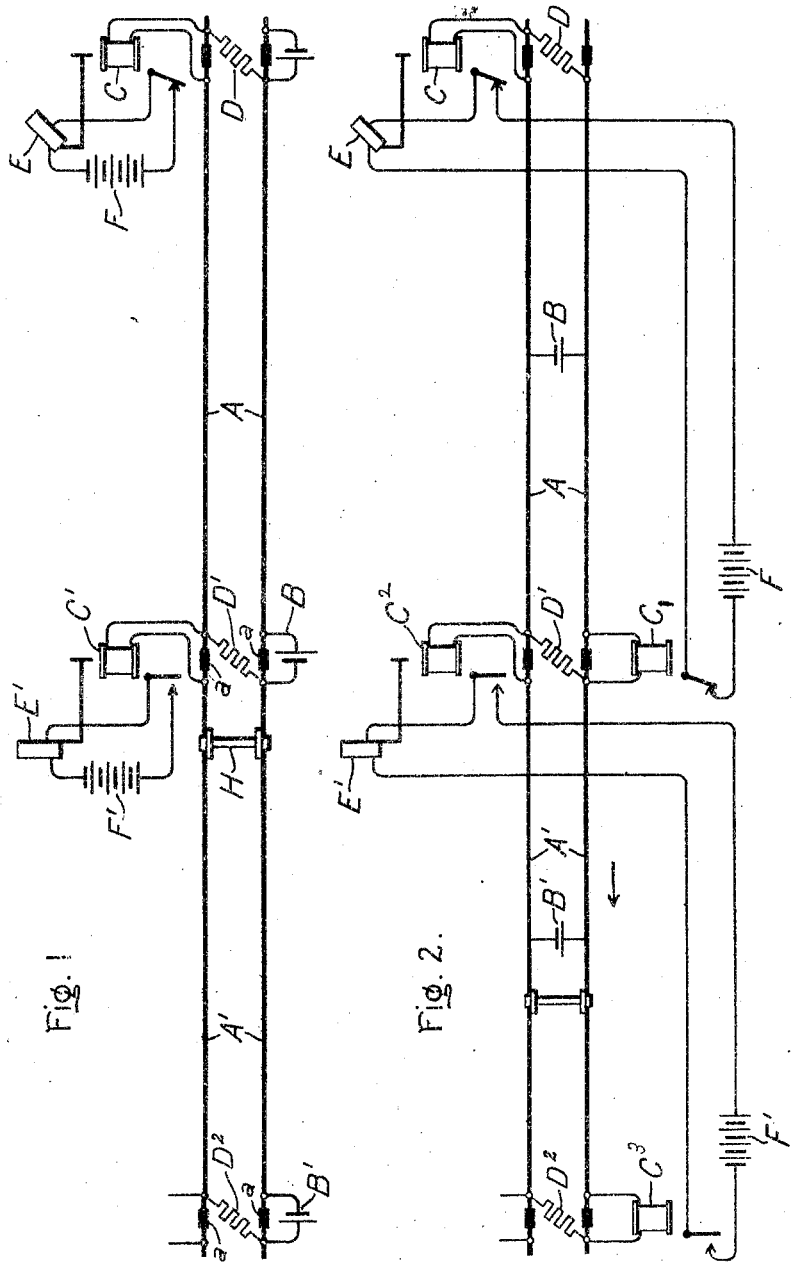
Witnesses:
Earl S. Klock.
J. Ellis Glen
Inventor:
William B. Potter,
by Albert G. Davis
His Attorney.

UNITED STATES PATENT OFFICE.

WILLIAM B. POTTER, OF SCHENECTADY, NEW YORK, ASSIGNOR, BY MESNE ASSIGNMENTS, TO THE UNION SWITCH AND SIGNAL COMPANY, A CORPORATION OF PENNSYLVANIA.

BLOCK-SIGNAL SYSTEM.

1,063,591.  Specification of Letters Patent.  Patented June 3, 1913.

Application filed January 22, 1910. Serial No. 539,470.

*To all whom it may concern:*

Be it known that I, WILLIAM B. POTTER, a citizen of the United States, residing at Schenectady, county of Schenectady, State of New York, have invented certain new and useful Improvements in Block-Signal Systems, of which the following is a specification.

My invention relates to block signal systems for railways, and its object is to provide a novel form of track circuit in which particularly reliable relay operation is obtained.

My invention consists in a novel arrangement of the track circuit connections. The rails of adjacent blocks are insulated from each other in the usual manner by insulated joints, but the track relays which are polarized are connected across the insulated joints instead of between the rails, as in the ordinary track circuit, and the track circuits are closed by resistances cross connecting diagonally opposite rails of adjacent blocks. The advantages of this novel connection are, first, that more positive shunting is obtained than with the ordinary track circuit, since, when the train has just entered a block, the track relay for that block has a reverse torque, as will be hereinafter explained, and, second, the breaking down of insulated joints cannot produce a false clear indication, as is possible with the ordinary track circuit.

My invention will best be understood by reference to the accompanying drawings in which—

Figure 1 shows diagrammatically a block signal system having track circuits arranged in accordance with my invention, and Fig. 2 shows a modification of the same.

In Fig. 1, A and A' represent the rails of adjacent blocks which are separated from each other by insulated joints $a$ in the usual manner. B and B' represent track batteries, or other sources of current, which, in this figure, instead of being connected across the rails in the usual manner, are connected across insulated joints. C and C' are track relays, the windings of which are also connected across insulated joints instead of between the rails. These relays are polarized, as is indicated in the conventional manner employed in the railway signaling art. D, D' and $D^2$ represent resistances cross connecting diagonally opposite rails of adjacent blocks. E and E' represent the signals for the blocks, and F, F' the batteries for operating the signal mechanisms. Each track circuit includes a track battery, the rails, a relay winding and two resistances, each resistance being common to two adjacent track circuits. Thus, the current from battery B flows through resistance D', upper rail A, relay C, resistance D, and lower rail A back to the battery. The current from battery B' flows through lower rail A', resistance D', relay C', upper rail A', and resistance $D^2$ back to the battery. Thus, the currents from both batteries flow through resistance D' and it will be noted that the batteries are so connected that the current from both batteries flows through the resistance in the same direction. As long as the blocks are unoccupied the relays are energized in the ordinary manner through the track circuits just traced. When a train enters a block, as is indicated at H in block A', the relay C' is cut off from the battery B' but is connected through the wheels and axles of the car in shunt to the resistance D', so that a portion of the current from battery B now flows through relay C'. By noting the relative polarities of the batteries B and B' it will be seen that the current thus supplied to relay C' from battery B is in the opposite direction to that normally supplied to this relay from its own battery B'. A reverse torque is, therefore, produced in the relay which makes the operation of the relay very positive. Furthermore, no false clear indications can arise from broken down joints, since the breaking down of a joint simply short-circuits either the relay winding or the battery which is connected around it.

Fig. 2 shows the application of my invention to track circuits in which the batteries are placed at the centers of the blocks as is sometimes done when the blocks are long. In this figure the batteries B and B' are connected across the rails in the usual manner, while two track relays per block are provided one at each end of the block. Thus, the block A has two relays C and $C^1$ both controlling the signal E, and the block A' has two relays $C^2$ and $C^3$ both controlling signal E'. As in Fig. 1, the track batteries are so connected that the currents from them flow in the same direction through the resistance D' between the blocks.

In Fig. 2, when a train occupies the entering end of a block, for example block A', it places relay C² in parallel with resistance D' and this relay then receives current from battery B which current is in the direction opposite to normal so that it tends to positively hold this relay open. Similarly, when a train occupies the exit end of block A', it places relay C³ in parallel with resistance D² so that this relay then receives current from the battery next in advance and this current is in the direction opposite to normal so that it tends to positively hold this relay open. In the arrangement of this figure the breaking down of an insulated joint simply short-circuits the relay connected around the joint.

I do not desire to limit myself to the particular connections and arrangement of parts shown and described, and aim in the appended claims to cover all modifications which are within the scope of my invention.

What I claim as new and desire to secure by Letters Patent of the United States, is,—

1. In a block signal system, in combination with a railway having the rails of adjacent blocks separated by insulated joints, resistances between adjacent blocks each connecting a rail of one block with the diagonally opposite rail of an adjacent block, sources of current for the track circuits, polarized track relays each having a winding connected around one of said insulated joints, and signals controlled by said relays.

2. In a block signal system, in combination with a railway having the rails of adjacent blocks separated by insulated joints, sources of current connected to the rails, polarized track relays each having a winding connected around one of said insulated joints, and resistances connecting diagonally opposite rails of adjacent blocks and forming with the sources, rails, and relay windings closed track circuits, said resistances being common to adjacent track circuits, and signals controlled by said relays.

3. In a block signal system, in combination with a railway having the rails of adjacent blocks separated by insulated joints, sources of current connected across the rails near the centers of the blocks, resistances connecting diagonally opposite rails of adjacent blocks, polarized relays, one at each end of each block connected across one of said insulated joints, and signals controlled by said relays.

In witness whereof, I have hereunto set my hand this 19th day of January, 1910.

WILLIAM B. POTTER.

Witnesses:
 BENJAMIN B. HULL,
 HELEN ORFORD.